Feb. 14, 1956   C. E. FOWLER, JR., ET AL   2,734,781
METHOD AND APPARATUS FOR ELEVATING GRANULAR MATERIAL
Filed Oct. 17, 1950
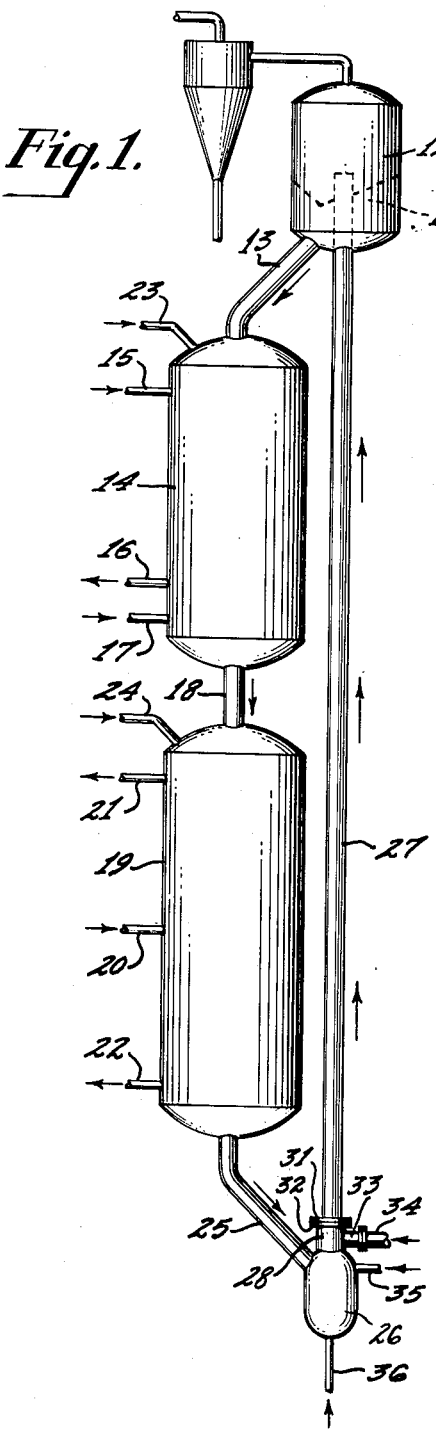
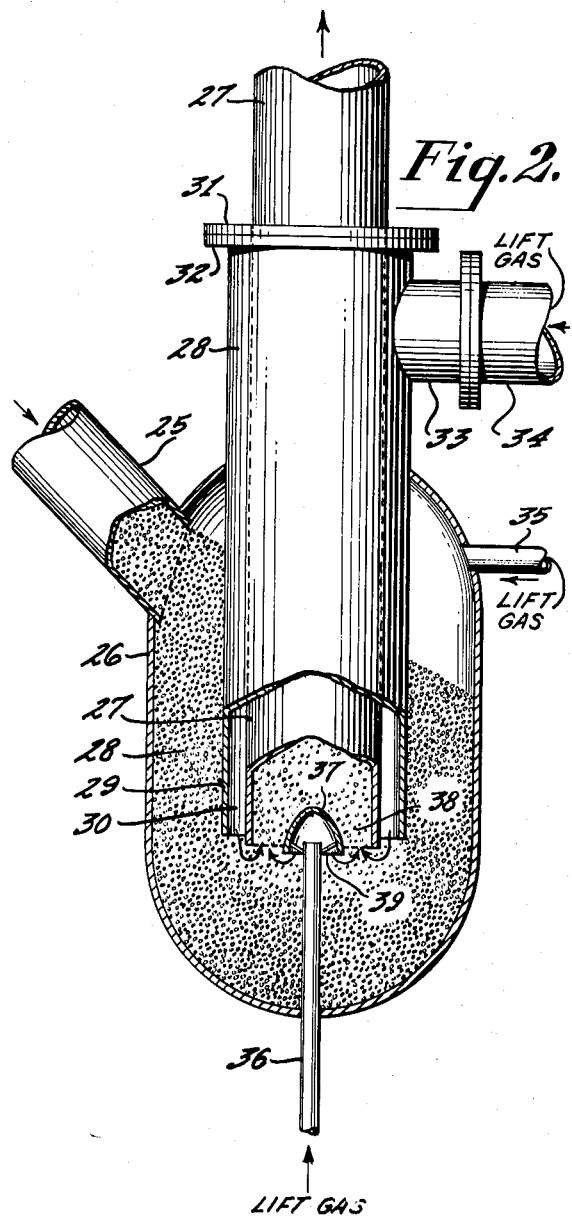
INVENTORS
CARL E. FOWLER, JR.
& JOSEPH L. DAILY
BY William Klabunde
ATTORNEY United States Patent Office 2,734,781
Patented Feb. 14, 1956

2,734,781

METHOD AND APPARATUS FOR ELEVATING GRANULAR MATERIAL

Carl E. Fowler, Jr., Hattiesburg, Miss., and Joseph L. Daily, Chester, Pa., assignors to Houdry Process Corporation, Wilmington, Del., a corporation of Delaware Application October 17, 1950, Serial No. 190,546

8 Claims. (Cl. 302—25)

This invention relates to a method and apparatus for elevating granular material by means of a gaseous lift medium through an elongated confined lift path extending upwardly between the terminal points of a downflow path through which the granular material gravitates in a cyclic procedure. In particular, the invention is applicable to hydrocarbon conversion or other chemical processing systems wherein granular contact material, which may be of a catalytic nature, is passed downwardly by gravity flow through one or more contact zones in which desired reactions may be carried out, or in which other treatment of the granular material may be effected, and is then elevated for reuse.

In pneumatic lifts so employed, it is a common practice to employ an elongated pipe for the confined lift path with vessels or hoppers at the lower and upper ends thereof to provide, respectively, an introduction zone wherein the granular material is engaged by the gaseous lift medium and carried thereby into and upwardly through the lift pipe, and a disengaging zone wherein the elevated contact material is separated from the lift gas and returned to the downflow path.

A typical example of a system to which the present invention may be advantageously applied is illustrated and described in an article entitled "Houdriflow: new design in catalytic cracking," appearing at page 78 of the January 13, 1949 issue of the "Oil and Gas Journal."

The invention will hereinafter be described and illustrated in connection with a system of the foregoing type, although it is not to be construed as limited thereto. Briefly, the above-cited article discloses a catalytic cracking system for refining hydrocarbons which comprises superimposed reaction and regeneration vessels connected serially to provide a continuous downflow path for catalytic contact material in the form of granules, beads, or pellets. The catalyst is supplied to the downflow path from an upper lift hopper disposed at an elevation substantially above the uppermost vessel, containing the reaction zone, and after passing through the system is withdrawn from the lowermost vessel, containing the regeneration zone, and passed downwardly into a lower lift hopper. Within the reactor and the regenerator the catalyst gravitates as a compact, non-turbulent, moving bed and within the connecting conduits the catalyst gravitates in the form of a compact moving column.

The lower lift hopper constitutes an introduction chamber comprising an engaging zone wherein the catalyst, continuously supplied from the lower discharge end of the downflow path, is engaged by the stream of lift gas, separately introduced, and conveyed thereby into the lower end of the lift pipe. The lower end of the lift pipe is situated at a low point within the introduction chamber, and is continuously submerged within a moving bed of catalyst. The lift pipe extends upwardly to a point well within the upper lift hopper, so that catalyst discharging from the upper end of the lift pipe and separated from the lift gas may settle to form a moving bed in the lower region of the disengaging zone.

In the operation of pneumatic lifts for elevating catalyst in bead or pellet form having, for example, a particle size of about 0.05 to 0.5 inch in diameter, one of the principle problems, especially when particle velocities up to about 30–40 feet per second are employed, is to avoid excessive attrition of the beads or pellets. Turbulence of the catalyst stream within the lift pipe or at the points of introduction thereto or discharge therefrom tends to cause attrition of the catalyst particles by reason of violent inter-particle contact and impact between the catalyst particles and the inner surfaces of the equipment. When the broken or attrited particles are of a size smaller than the minimum size desired for effective and efficient operation, means are employed for rejecting them from the system and replacing them with fresh catalyst. The attrition, therefore, in representing a direct loss of contact mass to the operation is an important factor in the overall economics of that operation. It has been found that such attrition losses as may occur within the introduction zone are most effectively minimized when the catalyst is conveyed through the zone of rapid acceleration at the mouth of the lift pipe as a smooth flowing stream of relatively uniform particle distribution.

The present invention is directed to a method, and apparatus for carrying out the same, by which the catalyst may be introduced into the lift pipe as a relatively smooth flowing stream with a minimum of inter-particle or particle-to-vessel impact, so that attrition of the particles and erosion of the equipment may be kept within low and economical limits.

In accordance with the present invention, the granular material is passed from the lower end of the downflow path into the upper region of the introduction zone within the lower lift hopper, where it forms a compact downwardly moving, non-turbulent bed about and below the lower end of the lift pipe. The lower end of the confined path formed by the lift pipe is centrally obstructed so that the granular material enters the lift pipe in annular stream formation. Lift gas is introduced into the introduction zone in three separate streams to engage the granular material and carry it into and upwardly through the lift pipe. The stream of lift gas initially engaging the granular material is introduced into the upper region of the introduction zone, preferably though not necessarily in the solids-free space above the moving bed, and travels downwardly in concurrent flow with the granular material. Such gas is introduced in such quantity as to constitute a minor portion of the total lift gas, but sufficient to carry the granular material in the lower region of the introduction zone inwardly under the lower end of the lift pipe and then upwardly toward the annular opening formed between the perimeter of the lift pipe and the central obstruction. As the catalyst assumes its annular stream formation in passing from the bed into the lift pipe, it is engaged interiorly and exteriorly by peripheral streams of lift gas which impart sufficient additional energy to the granular material to accelerate its movement into and upwardly through the lift pipe. Preferably, though not necessarily, the interior and the exterior streams of peripheral lift gas are circumferentially complete streams.

In a preferred embodiment of the invention, the interior and the exterior streams of peripheral lift gas are introduced into the moving bed in a downward direction laterally adjacent the lower edges of the annular path forming members, so that said streams undergo a reversal of direction in passing laterally under the lower edges of the lift pipe and the central obstruction and then upwardly into the annular portion of the lift path. The first-mentioned stream of lift gas introduced in the upper region of the introduction zone, which gas may for convenience be termed bed gas since it must pass with and through a substantial portion of the bed before reaching the lift pipe inlet, constitutes a minor or secondary portion of the total lift gas. Such secondary gas is introduced in quantity sufficient only to cause the granular material to flow readily to the region immediately adjacent the annular mouth of the lift path where it may be engaged by the peripheral streams of lift gas and carried thereby at substantially increased velocity into and through the lift pipe. The lift gas introduced along the outer periphery of the annular stream of solids entering the lift pipe constitutes the major portion of the total lift gas, the quantity and velocity thereof being such as to effect substantial acceleration, with consequent reduction of solid particle concentration, of the stream of granular material as it passes upwardly through the lift pipe. The lift gas introduced along the inner periphery of the annular stream of solids entering the lift pipe also constitutes a minor or secondary portion of the total lift gas. It helps to provide a smooth uniform flow of solids into the lift pipe, and it provides a cushion of gas along the surface of the central obstruction to minimize erosion thereof by impingement of the solid particles.

The major lifting effect is provided by the primary stream of lift gas above-described, both the bed gas and the inner peripheral gas, singly or in combination, being insufficient in quantity to elevate the granular material through the lift pipe. The bed gas, however, provides a process control whereby the flow rate of solids into the lift pipe may be advantageously controlled.

For a fuller understanding of the invention reference may be had to the accompanying drawing forming a part of this application, in which:

Fig. 1 diagrammatically illustrates a hydrocarbon conversion system, including a gas lift for circulating granular material, to which the method and apparatus of the invention may be applied; and Fig. 2 is an enlarged sectional elevation of the lower lift hopper, or introduction chamber, illustrating the method and apparatus by which the granular material is engaged by the lift gas and conveyed therewith upwardly into and through the lift pipe.

Referring to the embodiment illustrated in the drawing, Fig. 1 shows a typical hydrocarbon conversion system in which contact material, such as catalyst in the form of granules, pellets, etc., flows downwardly by force of gravity as a compact moving bed 11 in the lower region of an upper lift hopper 12, the latter comprising the disengaging zone referred to hereinafter. The catalyst is continuously withdrawn from upper lift hopper 12 as a compact moving column through a seal leg 13 and is passed into the upper end of a reaction chamber 14 wherein, in known manner, the catalyst gravitates as a compact moving bed while being contacted with gaseous reactants introduced into the reaction chamber, as through inlet 15, to carry out the desired conversion. The gaseous products of reaction are separated from the catalyst in the lower portion of the chamber 14, the former being withdrawn from the vessel, as through outlet 16, and passed to subsequent treating sections of the system, not shown. The latter, bearing a carbonaceous deposit thereon, is stripped of vaporizable hydrocarbon material in conventional manner by contact with stripping gas introduced in the bottom of the chamber 14, as through inlet 17, and is then withdrawn from the chamber as a compact moving column through seal leg 18.

The stripped, spent catalyst is passed through seal leg 18 into the upper end of a regenerator 19, wherein the contaminated material is contacted with a combustion-supporting gas, introduced into the regenerator through inlet line 20, to burn off the carbonaceous deposit. The catalyst gravitates as a compact moving bed through the regenerator 19. Since inlet line 20 is connected to the regenerator at an intermediate level, the flow of gas and solids will be counter-current in the upper region of the vessel and concurrent in the lower region thereof. The gaseous products of combustion, or flue gas, are withdrawn from the regenerator 19, as by outlet lines 21 and 22, and disposed of in the usual manner. A portion of the flue gas may be employed as a gaseous lift medium for returning the catalyst to the upper lift hopper, as will presently be described. Following conventional practice, seal gas may be introduced into the upper region of reactor 14 and regenerator 19 through inlet lines 23 and 24, respectively.

The regenerated catalyst is withdrawn from the bottom of regenerator 19 as a compact moving column through seal leg 25, and is passed into a lower lift hopper 26 which provides an introduction chamber or engaging zone wherein the catalyst is engaged by a lift gas, such as air, steam, etc., or by flue gas withdrawn from the regenerator through outlets 21 and 22, and conveyed upwardly through a lift pipe 27 to the upper lift hopper 12.

For a clear illustration of a method and means by which such engagement of lift gas and catalyst may be effected, reference may be made to Fig. 2, which shows an enlarged view of the interior of the lower lift hopper 26, representing one embodiment of the invention.

Fig. 2 is an enlarged sectional view of the lower lift hopper 26 showing the means for introducing the catalyst and the lift gas into the introduction zone or chamber, and the arrangement of apparatus by which the desired movement of catalyst into the lift path is effected.

In the embodiment of the invention illustrated in Fig. 2, the lift pipe 27 extends through an opening provided in the upper end wall of the lower lift hopper 26, and terminates in the lower region thereof at a level sufficiently above the bottom of the hopper to permit catalyst introduced in the upper region of the chamber to gravitate as a compact non-turbulent bed 28 around and below the open lower end of the lift pipe.

The lower end of the lift pipe 27 is surrounded by a spaced concentric sleeve 29 which extends upwardly from a point adjacent, either above or below, the lower end of the lift pipe through the opening in the upper end of the lift hopper to a point above the lift hopper, thus forming an annular passage 30 between the sleeve and the lift pipe. The upper end of annular passage 30 is sealed, as by a cover plate 31 attached to a flange 32 on the upper end of the sleeve. A side inlet 33 is provided at the upper end of sleeve 29 through which primary lift gas may be supplied from a conduit 34 connected to a gas source, not shown. As stated, the source of such primary lift gas may be the flue gas outlet from the regenerator 19.

Lift gas is additionally supplied to the introduction zone through conduit 35 connected to the source which supplies lift gas to conduit 34, or to any other source, not shown. Conduit 35 discharges into the catalyst-free space at the upper end of the lower lift hopper above the surface of the bed 28, the catalyst inlet 25 being so positioned that the surface of the catalyst, while assuming its normal angle of repose within the chamber, falls below the lift gas inlet line 35. The lift gas, or bed gas, supplied through conduit 35 enters the bed 28 through its upper surface and travels downwardly about the sleeve 29 concurrently with the catalyst to the lower region of the chamber, where it passes inwardly toward the axis of the lift and then upwardly, by reason of the lifting effect of the gas so supplied, toward the mouth of the lift pipe. While the bed gas is effective to assist in elevating the catalyst to the lift inlet, it is not supplied in sufficient quantity to elevate the catalyst through the lift pipe. Catalyst movement thus effected is therefore at relatively low velocity.

Additional lift gas is supplied to the introduction zone through conduit 36 connected to a source, not shown, and extending upwardly through the bottom wall of the lift hopper 26 to a point substantially centrally of the mouth of the lift pipe 27. Conveniently, the conduit 36 may be disposed in axial alinement with the lift pipe 27, as shown.

An inverted cup-shaped member 37 is placed over, and suitably supported by, the upper end of conduit 36, the lower rim of the member 37 being situated approximately at or slightly below the level of the lower edge of the lift pipe. The cup-shaped member 37 is of considerably smaller diameter than the lift pipe, so as to form an obstruction centrally thereof while providing an annular passage 38 of sufficient cross-sectional flow area to accommodate the desired flow of solids into the lift. Lift gas discharging from the upper end of conduit 36 impinges against the concave surface of member 37 and has its direction of flow reversed, so that the lift gas discharges from under the cup-shaped member as a downwardly directed annular stream surrounding the conduit 36. The lift gas travels downwardly through the annular passage 39 formed between conduit 36 and member 37, then outwardly thereunder and upwardly into the annular passage 38 forming the mouth of the lift pipe. Catalyst moving inwardly toward the axis of the lift pipe under the combined influence of the bed gas introduced through inlet line 35 and the primary lift gas introduced through annular passage 30, is engaged by the lift gas discharging downwardly through annular passage 39 and is carried thereby upwardly into the intermediate annular passage 38 forming the mouth of the lift pipe.

The annular stream of catalyst formed at the inlet to annular passage 38 is thus engaged peripherally along its outer and its inner circumferences by downwardly discharging streams of lift gas introduced from annular passages 30 and 39, respectively, The primary lifting effect is provided by the gas discharging from annular passage 30. Lift gas discharging from annular passage 39 is of minor amount, but serves the dual function of acting as a cushion to minimize impingement of the catalyst against the outer surface of cup-shaped member 37, and of serving as process control gas for the purpose of varying the catalyst flow rate.

The catalyst, after engagement by the peripherally introduced lift gas, is rapidly accelerated and carried upwardly through the annular mouth of the lift pipe. The upper end of member 37 is preferably tapered so that the cross-sectional flow area of the lift pipe increases gradually until the entire flow area of the lift pipe is occupied by the catalyst stream.

The present method not only provides more rapid acceleration of the catalyst in the bottom of the lift, but also effects a more uniform distribution of the solid particles across the path of flow. By providing an obstruction, such as member 37, in the central portion of the lift inlet we avoid the formation of a center core of slowly moving catalyst at the bottom of the lift pipe, thereby minimizing catalyst attrition which would otherwise occur. The secondary lift gas introduced through conduit 36 also serves a two-fold purpose in that it aids in accelerating the movement of catalyst into the lift pipe and it prevents serious erosion of the member 37. Thus, in providing a smooth flow of catalyst into the annular lift inlet between peripheral streams of lift gas, severe contact of impact between the separate catalyst particles and between the particles and the wall surfaces of the equipment is largely avoided.

The present invention, by way of example, is readily adapted for use in relatively large lift systems having a lift path height of several hundred feet, a lift pipe diameter of 10–24 inches, and operating under conditions effective to elevate 100–400 tons per hour of catalyst having a particle size of 0.05 to 0.5 inch in diameter. Gas pressure at the point of introduction to the lift hopper may be in the range of 1–10 lbs./sq. in. gauge, and discharge velocities of the catalyst leaving the lift pipe may be about 25–45 ft./sec., in the absence of special arrangements for decelerating the catalyst prior to discharge. Average particle concentrations within the lift may be about 1–7 lbs./cu. ft.

It is to be understood that the foregoing data is merely by way of example, and that the invention is susceptible of broader application. It is desired, therefore, that only such limitations shall be placed thereon as are imposed by the appended claims.

We claim as our invention:

1. A method for elevating granular material through an upwardly extending confined lift path by means of a gaseous lift medium which comprises the steps of passing said material downwardly as a confined compact moving bed about and below the lower end portion of said lift path, said bed being maintained at a constant level by continuously replenishing said granular material, introducing a first stream of lift gas comprising a minor portion of the total lift gas into said moving bed at a substantial distance from the inlet end of said lift path to convey said material at low velocity to said inlet, passing said material through said inlet and along the lower portion of said lift path as a confined annular stream, introducing a second and separate stream of lift gas comprising the substantial major portion of the total lift gas into said moving bed along the lower outer perimeter of said annular stream, and introducing a third separate stream of lift gas also comprising a minor portion of the total lift gas into said moving bed along the lower inner perimeter of said annular stream, said second and third streams of lift gas combining to elevate said material through said lift path at substantially higher velocity and lower particle concentration.

2. A method as defined in claim 1 in which said second and third streams of lift gas, comprising respectively major and minor portions of the total lift gas, are directed downwardly into said bed to engage the material moving relatively slowly toward the lift inlet under the influence of said first stream of lift gas and to convey the same at substantially increased velocity into and upwardly through said lift path.

3. Apparatus for elevating granular material through a lift pipe by means of lift gas comprising a chamber surrounding the lower end portion of said lift pipe and adapted to contain a compact moving bed of said granular material flowing downwardly about and below said end portion, means for continuously introducing said granular material into the upper region of said chamber to maintain the surface of said bed above the lower end of said lift pipe, means for introducing the substantial major portion of said lift gas directly into said bed as a confined annular stream discharging downwardly about and adjacent to the lower perimeter of said lift pipe, means for independently introducing a relatively minor portion of said lift gas into said chamber at a location remote from the lower end of said lift pipe, a hollow member centrally positioned within the bottom region of said lift pipe and forming therewith an annular inlet passage for gas-conveyed granular material, means for introducing another relatively minor portion of said lift gas into said hollow member, and means for discharging lift gas from said hollow member as a downwardly directed stream along the entire inner lower perimeter of said annular inlet passage.

4. Apparatus as defined in claim 3 in which said hollow member is in the form of an inverted cup having its side portions gradually converging toward the axis of said lift pipe, whereby the flow area of said annular inlet passage increases gradually until it equals the flow area of said lift pipe.

5. Apparatus as defined in claim 3 in which the last-mentioned means for introducing a relatively minor portion of said lift gas comprises a conduit extending upwardly through the bottom wall of said chamber and terminating at a low point centrally within said lift pipe, and in which said hollow member comprises a spaced inverted cup-shaped member surrounding the upper end portion of said conduit and forming an annular passage therebetween for said stream of lift gas discharging downwardly into said bed along the inner perimeter of said annular inlet passage.

6. Apparatus as defined in claim 5 in which said means for introducing the substantial major portion of said lift gas into said moving bed comprises a spaced concentric sleeve member surrounding the lower end portion of said lift pipe and forming therewith an annular passage communication with said chamber only along the lower outer perimeter of said lift pipe, and inlet means for introducing said major portion of said lift gas into the upper end of said annular passage.

7. Apparatus for elevating granular material through an upwardly extending lift pipe comprising a chamber surrounding the lower end portion of said lift pipe to provide a confined path for passing said granular material as a compact moving bed downwardly about and below said lift pipe, means for introducing lift gas into said moving bed in a confined stream discharging downwardly adjacent and about the lower perimeter of said lift pipe, a hollow member open at its lower end and concentrically arranged within the lower end portion of said lift pipe and spaced therefrom to form an annular lift path, and means for introducing lift gas into said hollow member, the lift gas introduced into said hollow member discharging downwardly and outwardly therefrom into said bed, said material being carried upwardly through said annular path by the total of said lift gas.

8. Apparatus for elevating granular material through an upwardly extending lift pipe comprising a chamber surrounding the lower end portion of said lift pipe to provide a confined path for passing said granular material as a compact moving bed downwardly about and below said lift pipe, means remote from the end of said lift pipe for introducing lift gas into said moving bed, means for introducing lift gas into said moving bed in a confined stream discharging downwardly adjacent and about the lower perimeter of said lift pipe, a hollow member open at its lower end and concentrically arranged within the lower end portion of said lift pipe and spaced therefrom to form an annular lift path, and means for introducing lift gas into said hollow member, the lift gas introduced into said hollow member discharging downwardly and outwardly therefrom into said bed, said material being carried upwardly through said annular path by the total of said lift gas.

References Cited in the file of this patent

UNITED STATES PATENTS

| 528,417 | Duckham | Oct. 30, 1894 |
| 1,364,532 | Von Porat | Jan. 4, 1921 |
| 2,561,771 | Ardern | July 24, 1951 |

FOREIGN PATENTS

| 82,016 | Switzerland | Oct. 16, 1919 |
| 268,667 | Great Britain | Apr. 7, 1927 |